US012768669B2

(12) United States Patent
Ogata

(10) Patent No.: US 12,768,669 B2
(45) Date of Patent: Oct. 20, 2026

(54) MAP INFORMATION CORRECTION DEVICE AND MAP INFORMATION CORRECTION SYSTEM

(71) Applicant: HITACHI ASTEMO, LTD., Hitachinaka (JP)

(72) Inventor: Takeshi Ogata, Tokyo (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 72 days.

(21) Appl. No.: 18/561,427

(22) PCT Filed: Mar. 7, 2022

(86) PCT No.: PCT/JP2022/009750
§ 371 (c)(1),
(2) Date: Nov. 16, 2023

(87) PCT Pub. No.: WO2023/047636
PCT Pub. Date: Mar. 30, 2023

(65) Prior Publication Data

US 2024/0240965 A1 Jul. 18, 2024

(30) Foreign Application Priority Data

Sep. 22, 2021 (JP) ................................ 2021-154756

(51) Int. Cl.
*G01C 21/00* (2006.01)

(52) U.S. Cl.
CPC ................................ *G01C 21/3822* (2020.08)

(58) Field of Classification Search
CPC . G06V 20/588; G06V 10/75; B60W 2556/45; B60W 2556/50; B60W 30/12;
(Continued)

(56) References Cited

U.S. PATENT DOCUMENTS 5,584,273 A * 12/1996 Halsig ........................ F02D 9/02 123/400
5,973,409 A * 10/1999 Neibecker ........... B60R 16/0238 307/10.1
(Continued)

FOREIGN PATENT DOCUMENTS

CN 110431609 A 11/2019
CN 112013867 A * 12/2020 ......... G01C 21/3602
(Continued)

OTHER PUBLICATIONS

International Search Report with English Translation and Written Opinion of International Patent Application No. PCT/JP2022/009750 dated May 24, 2022 (9 pages).
(Continued)

*Primary Examiner* — Redhwan K Mawari
(74) *Attorney, Agent, or Firm* — Foley & Lardner LLP

(57) ABSTRACT

An object of the present invention is to determine a difference on a map by using an exterior environment recognition sensor of a traveling vehicle and host vehicle position estimation information on the basis of existing map information and to enable the difference to be transmitted to a map server. According to the present invention, there is provided an in-vehicle map information correction device that corrects map information, the map information correction device including: a map holding unit (102) that holds the map information; a position estimation unit (104) that estimates position information on a vehicle; at least one of a lane change information acquisition unit (106) that acquires lane change information indicating whether or not the vehicle has changed a lane and a dividing line information acquisition unit (105) that acquires information on a dividing line type of a road on which the vehicle is traveling; and a difference determination unit (103) that generates correction information for correcting the map information
(Continued)

based on at least one of the position information, the lane change information, and the information on the dividing line type.

9 Claims, 18 Drawing Sheets

(58) Field of Classification Search
CPC ..... B60W 2050/046; B60W 2420/403; B60W 2552/20
See application file for complete search history.

(56) References Cited

U.S. PATENT DOCUMENTS

| | | | | |
|---|---|---|---|---|
| RE46,828 | E * | 5/2018 | Spillane | B60K 23/0808 |
| 10,525,370 | B1 * | 1/2020 | Poteet | A63H 30/04 |
| 11,418,935 | B2 * | 8/2022 | Cai | H04W 76/15 |
| 2005/0060070 | A1 * | 3/2005 | Kapolka | G07C 5/008 701/31.4 |
| 2006/0178804 | A1 * | 8/2006 | Laichinger | F02D 41/28 701/115 |
| 2010/0299063 | A1 * | 11/2010 | Nakamura | G06V 20/588 701/532 |
| 2012/0299375 | A1 * | 11/2012 | Saez-Zamora | H05K 7/209 307/9.1 |
| 2017/0072876 | A1 * | 3/2017 | Rajan | H04L 12/66 |
| 2018/0275652 | A1 * | 9/2018 | Kuwahara | B60W 60/0059 |
| 2019/0230309 | A1 * | 7/2019 | Asayama | G06T 7/50 |
| 2019/0281052 | A1 * | 9/2019 | Lekkas | H04L 9/14 |
| 2020/0001910 | A1 * | 1/2020 | Chow | B60N 2/0028 |
| 2020/0031343 | A1 * | 1/2020 | Ogata | G08G 1/167 |
| 2020/0125858 | A1 * | 4/2020 | Bauer | G06F 11/2007 |
| 2020/0240806 | A1 * | 7/2020 | Daikoku | G08G 1/167 |
| 2021/0016778 | A1 * | 1/2021 | Yashiro | B60W 10/04 |
| 2021/0171029 | A1 * | 6/2021 | Sung | G06V 20/588 |
| 2021/0199463 | A1 * | 7/2021 | Kitahara | G01C 21/3815 |
| 2022/0073108 | A1 * | 3/2022 | Park | B60W 30/16 |
| 2022/0340076 | A1 * | 10/2022 | Lim | H04W 4/46 |
| 2023/0226928 | A1 * | 7/2023 | Barnett | B60K 1/00 180/291 |

FOREIGN PATENT DOCUMENTS

| | | | | |
|---|---|---|---|---|
| JP | 2004-341182 A | | 12/2004 | |
| JP | 2020-038361 A | | 3/2020 | |
| JP | 2020-046194 A | | 3/2020 | |
| WO | WO-2019203084 A1 | * | 10/2019 | G01C 21/3602 |

OTHER PUBLICATIONS

Chinese Office Action issued in CN Application. No. 202280034088.1 dated Jan. 16, 2026 with Machine Translation (30 Pages).

* cited by examiner

FIG. 7a

| PRE-FORK TRAVELING ROAD ID | POST-FORK TRAVELING ROAD ID | LANE CHANGE FLAG |
|---|---|---|
| AAAA | BBBB | NO FLAG |

FIG. 7b

| PRE-MISMATCH DIVIDING LINE TYPE: LEFT | PRE-MISMATCH DIVIDING LINE TYPE: RIGHT | DIVIDING LINE TYPE AT TIME OF MISMATCH: LEFT | DIVIDING LINE TYPE AT TIME OF MISMATCH: RIGHT | TRAVELING ROAD ID |
|---|---|---|---|---|
| SOLID LINE | BROKEN LINE | BROKEN LINE | BROKEN LINE | A |

FIG. 7C

| LEFT BEFORE DIVIDING LINE CHANGE | RIGHT BEFORE DIVIDING LINE CHANGE | LEFT AFTER DIVIDING LINE CHANGE | RIGHT AFTER DIVIDING LINE CHANGE | TRAVELING ROAD ID | TRAVELING ROAD POSITION (LATITUDE, LONGITUDE) |
|---|---|---|---|---|---|
| SOLID LINE | BROKEN LINE | SOLID LINE (YELLOW) | SOLID LINE (YELLOW) | AAAA | XXX, YYY |

FIG. 8a

| | PRE-FORK TRAVELING ROAD ID | POST-FORK TRAVELING ROAD ID | LANE CHANGE FLAG |
|---|---|---|---|
| 1 | AAAA | BBBB | NO FLAG |
| 2 | AAAA | CCCC | RIGHT |
| 3 | AAAA | BBBB | LEFT |

FIG. 8b

| | LEFT BEFORE DIVIDING LINE CHANGE | RIGHT BEFORE DIVIDING LINE CHANGE | LEFT AFTER DIVIDING LINE CHANGE | RIGHT AFTER DIVIDING LINE CHANGE | TRAVELING ROAD ID |
|---|---|---|---|---|---|
| 1 | SOLID LINE | BROKEN LINE | BROKEN LINE | BROKEN LINE | DDDD |
| 2 | BROKEN LINE | BROKEN LINE | BROKEN LINE | SOLID LINE | EEEE |

FIG. 8c

| | LEFT BEFORE DIVIDING LINE CHANGE | RIGHT BEFORE DIVIDING LINE CHANGE | LEFT AFTER DIVIDING LINE CHANGE | RIGHT AFTER DIVIDING LINE CHANGE | TRAVELING ROAD ID | TRAVELING ROAD POSITION (LATITUDE, LONGITUDE) |
|---|---|---|---|---|---|---|
| 1 | SOLID LINE | BROKEN LINE | SOLID LINE (YELLOW) | SOLID LINE (YELLOW) | AAAA | XXX,YYY |
| 2 | BROKEN LINE | BROKEN LINE | SOLID LINE (YELLOW) | SOLID LINE (YELLOW) | AAAA | XYY,YXX |
| 3 | BROKEN LINE | SOLID LINE | SOLID LINE (YELLOW) | SOLID LINE (YELLOW) | AAAA | XXY,YYX |

MAP INFORMATION CORRECTION DEVICE AND MAP INFORMATION CORRECTION SYSTEM

TECHNICAL FIELD

The present invention relates to a map information correction device and a map information correction system.

BACKGROUND ART

PTL 1 discloses that "in a case where map data is corrected on a map database side based on transmitted map data correction information, the transmitted map data correction information is limited to voice data, and even if the map data correction information is the same map data correction information at the same place, subjectivity, viewpoint, operational behavior, or the like may differ depending on a user. Therefore, a person on the map database site side who corrects the map data has to go to an actual place and investigate and check the actual state, and a problem often arises in that a workload for this is necessary".

CITATION LIST

Patent Literature

PTL 1: JP 2004-341182 A

SUMMARY OF INVENTION

Technical Problem

Objects of the present invention are to provide a map information correction device capable of determining a difference in map information by using an exterior environment recognition sensor of a traveling vehicle and host vehicle position estimation information based on existing map information and transmitting the difference to a map server, and a map information correction system that corrects map information based on the difference in map information.

Solution to Problem

A map information correction device of the present invention to solve the problems includes: a map holding unit that holds the map information including lane information of a road; a position estimation unit that estimates position information of a vehicle; at least one of a lane change information acquisition unit that acquires lane change information indicating whether or not the vehicle has changed a lane and a dividing line information acquisition unit that acquires information of a dividing line type of a road on which the vehicle is traveling; and a generation unit that generates correction information for correcting the map information based on at least one of the position information, the lane change information, and the information of a dividing line type.

Advantageous Effects of Invention

According to the present invention, map correction can be performed with a small number of steps, and highly reliable map information can be used more easily.

Additional features related to the present invention will be clarified from the description of the present specification and the accompanying drawings. In addition, problems, configurations, and effects than those described above will be clarified by the following description of embodiments.

BRIEF DESCRIPTION OF DRAWINGS

FIG. 7*a* is an example of map correction information.

FIG. 7*b* is an example of the map correction information.

FIG. 7*c* is an example of the map correction information.

FIG. 8*a* is an example of the map correction information.

FIG. 8*b* is an example of the map correction information.

FIG. 8*c* is an example of the map correction information.

DESCRIPTION OF EMBODIMENTS

Next, examples of a map information correction device and a map information correction system according to the present invention will be described. In the example, a configuration in a case where the map information correction device and the map information correction system of the present invention are applied to a system that transmits and receives map information between an in-vehicle terminal and a map server will be described.

The map information correction system includes a plurality of in-vehicle terminals 100 mounted in a plurality of vehicles, respectively, and a map server 200 that transmits and receives map information to and from the plurality of in-vehicle terminals 100. Information communication between the plurality of in-vehicle terminals 100 and the map server 200 is performed through a wireless communication line.

Figure 1:
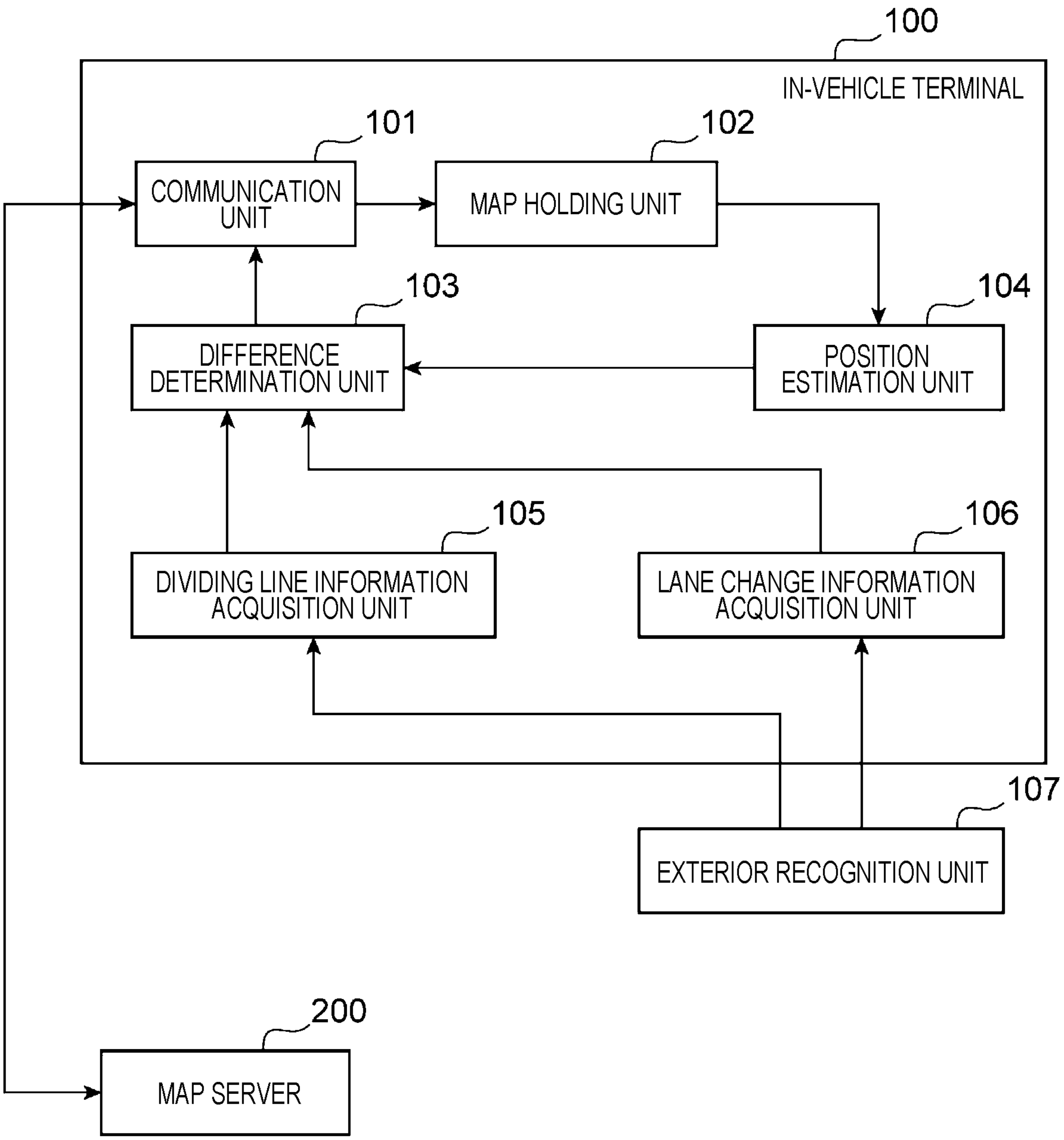
FIG. 1 is a diagram illustrating a configuration of an in-vehicle terminal.

FIG. 1 illustrates a configuration of an in-vehicle terminal 100.

The in-vehicle terminal 100 is configured to include hardware such as a central processing unit (CPU), a read only memory (ROM), a random access memory (RAM), and an electronic control unit (ECU) including a storage device such as a hard disk, and software programs stored in the storage device and executable by the CPU. The in-vehicle terminal 100 implements, as internal functions, a communication unit 101, a map holding unit 102, a difference determination unit 103, a position estimation unit 104, a dividing line information acquisition unit 105, and a lane change information acquisition unit 106 by executing the software programs. The in-vehicle terminal 100 corresponds to a map information correction device in the claims of the present invention.

The communication unit 101 communicates with the map server 200 and has a function of acquiring correction information for updating map information held by the map holding unit 102 and transmitting the correction information from the difference determination unit 103 to the map server 200. The communication unit 101 corresponds to an in-vehicle-side transmission unit and an in-vehicle-side reception unit in the claims of the present invention. The map holding unit 102 holds map information such as a map of a road on which the vehicle travels and has a function of providing the held map information to other functions of the in-vehicle terminal 100. The map information held by the map holding unit 102 is, for example, a map used in an automatic driving device and includes information on a fork section and a road ID by a node and a link. The position estimation unit 104 estimates a road on which a host vehicle is traveling on the basis of map information held by the map holding unit 102, vehicle state information such as a vehicle tire rotation speed or a steering angle (not illustrated), or position information of the IMU and the GNSS held by the position estimation unit 104.

An exterior recognition unit 107 is connected to the in-vehicle terminal 100. The exterior environment recognition unit 107 is provided inside a measurement device such as a camera or a radar mounted in a vehicle, for example. The exterior environment recognition unit 107 can recognize an exterior environment state such as a road situation around the vehicle on the basis of the measured information. The exterior environment recognition unit 107 may be provided in the in-vehicle terminal 100 instead of the measurement device.

The lane change information acquisition unit 106 determines whether the vehicle has made a lane change on the basis of a recognition result of the exterior environment recognition unit 107. For example, in a case where the camera recognizes that the vehicle crosses a left or right dividing line, the lane change information acquisition unit 106 determines that the lane change has been made. Moreover, operation information of a direction indicator of the host vehicle or operation information of a steering angle may be added to a determination element of the lane change.

The dividing line information acquisition unit 105 acquires information on left and right dividing line types of the vehicle based on the recognition result of the exterior environment recognition unit 107. It is assumed that dividing lines that divide a traveling lane are displayed on the left and right sides of the traveling lane of a road on which the vehicle travels. The dividing line includes a shape of a line such as a solid line, a dotted line, or a long broken line and a type of color line such as a white line or a yellow line and indicates various details in accordance with a legal system of each country. In the example, a description will be provided by taking, as an example, a case where a road is a left-side driving road, dividing lines indicating a left-side roadside and a right-side center line are white solid lines, and a dividing line positioned between the left-side roadside and the right-side center line is a white broken line.

The difference determination unit 103 generates correction information for correcting map information. The difference determination unit 103 corresponds to a generation unit in the claims of the present invention. The difference determination unit 103 implements a plurality of difference determining processes and determines whether or not a lane change is made, whether or not a line type changes, or a start point of a fork lane before or after a fork. The difference determination unit 103 determines whether there is an error in the map information of the map holding unit 102 based on the host vehicle traveling road which is a host vehicle position estimated by the position estimation unit 104, a type of dividing line acquired by the dividing line information acquisition unit 105, lane change information acquired by the lane change information acquisition unit 106, and the map information of the map holding unit 102. In addition, when there is an error, the difference determination unit 103 transmits information related to the error as correction information from the communication unit 101 to the map server 200. The map server 200 performs communication via the communication unit 101 of the in-vehicle terminal 100 and transmits and receives map information and information related to the error to and from the in-vehicle terminal 100. The map server 200 transmits and receives information to and from each of the plurality of in-vehicle terminals 100.

Figure 3:
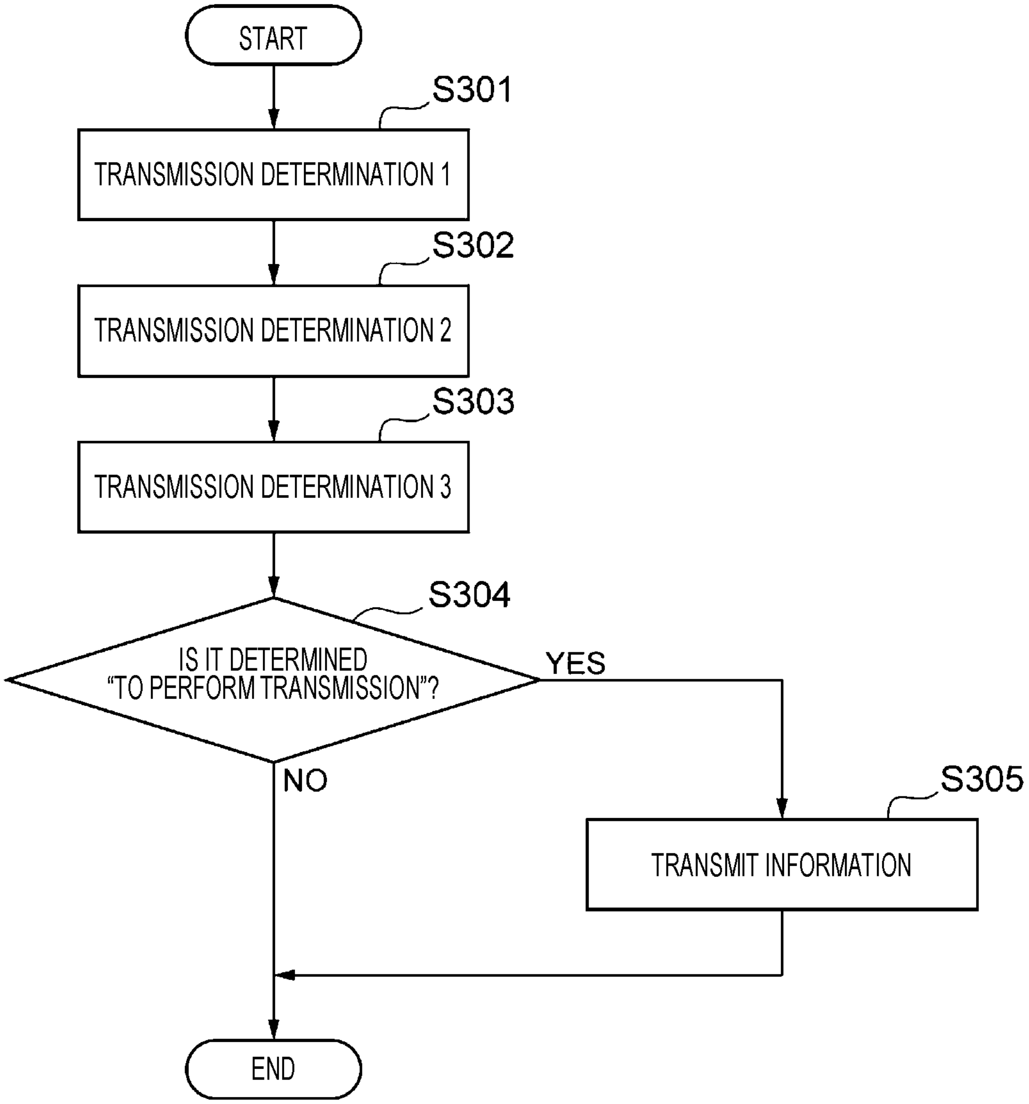
FIG. 3 is a flowchart of a difference determination unit.

FIG. 3 illustrates an example of an operation flowchart of the difference determination unit 103.

The operation of this flowchart is executed periodically. When the difference determination is started, Transmission Determination 1 (S301), Transmission Determination 2 (S302), Transmission Determination 3 (S303), and a plurality of transmission determinations are performed. Thereafter, in a case where it is determined "to perform transmission" in any of Transmission Determinations 1 to 3 (YES in S304), information is transmitted to the map server 200 (S305). In a case where it is not determined "to perform transmission" in all the transmission determinations of Transmission Determinations 1 to 3 (NO in S304), transmission is not performed. Moreover, in the example, a case where three types of transmission determinations are performed will be described as an example, but one or more types may be used.

Figure 4:
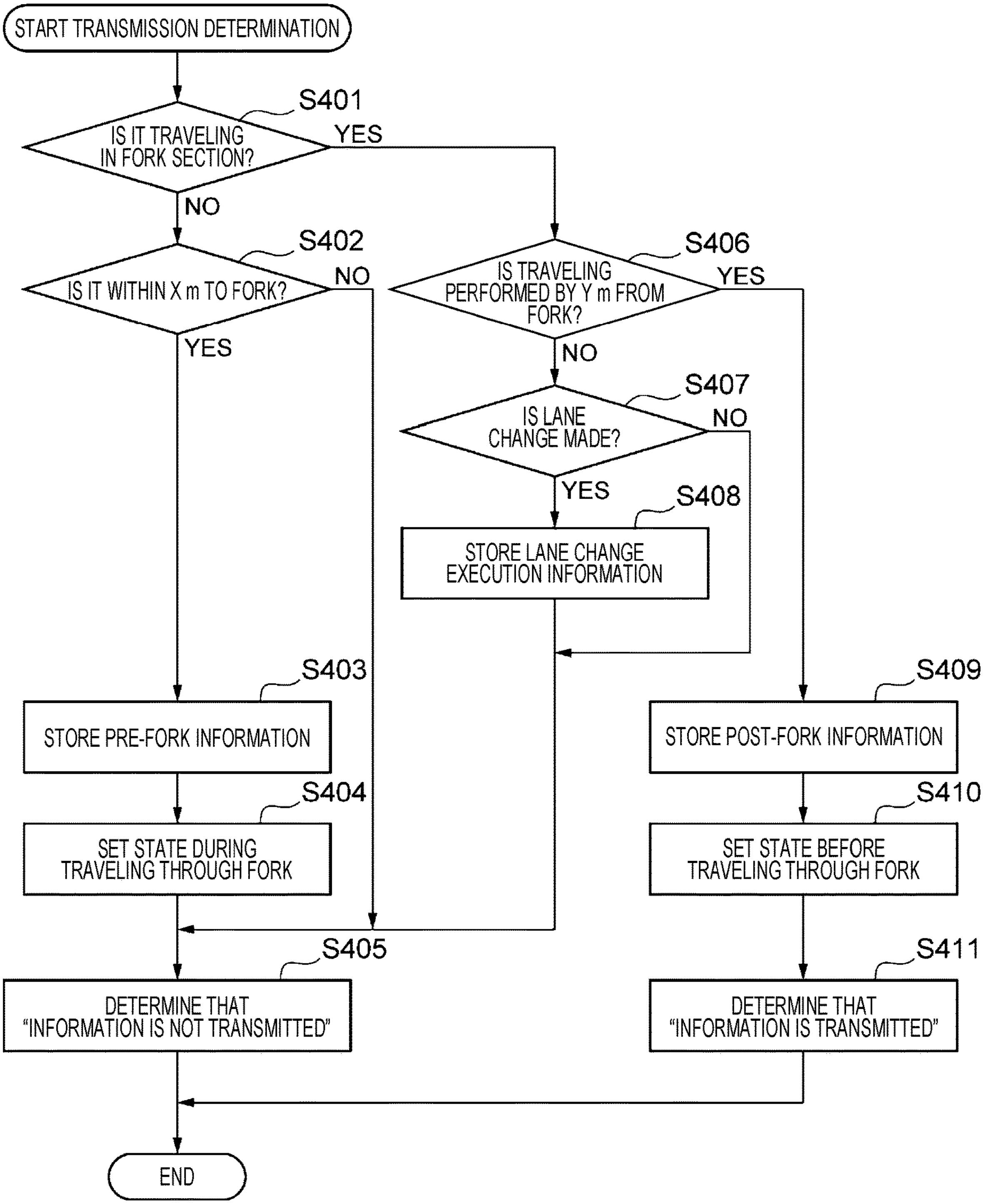
FIG. 4 is a flowchart of the difference determination unit.

FIG. 4 illustrates a flowchart regarding generation and transmission of information for determining a shape of a fork section as an example of the logic of Transmission Determination 1 (S301).

In Transmission Determination 1, it is determined whether a current traveling state of the host vehicle is traveling in a fork section of a traveling road (S401). The fork section of the traveling road is a place including a fork start position of a fork road forking from a main line and is set over a predetermined length in a front-rear direction of the traveling road with the fork start position as a reference.

When it is determined that the vehicle is not traveling in the fork section in S401 (NO in S401), it is determined whether the current vehicle position is within a predetermined distance X meters (m) to the fork section (S402). When the distance from the host vehicle to the fork section is within the predetermined distance X meters (m), information of a road ID of the traveling road before a fork (before the fork section) is stored (S403). Thereafter, the current traveling state of the host vehicle is set during the fork traveling (S404). Accordingly, it is determined that the information is not transmitted (S405), and a determination flow is ended. In a case where it is determined that the distance from the host vehicle to the fork section is longer than the predetermined distance X meters (m) (NO in S402), it is determined that information is not transmitted (S405), and the determination flow is ended.

When it is determined that the current traveling state of the host vehicle is traveling in the fork section (YES in S401), it is determined whether or not a position of the host vehicle on the road where the host vehicle is currently traveling has passed through the fork section and is separated by a predetermined distance Y meters (m) or longer (S406). Accordingly, when it is determined that the position of the host vehicle is not separated by the predetermined distance Y meters (m) or longer in S406 (NO in S406), that is, when the position of the host vehicle has passed through the fork section and is within the predetermined distance Y meters (m), it is determined whether or not the host vehicle has made a lane change in the fork section (S407).

When the host vehicle has not made a lane change (NO in S407), it is determined not to transmit information (S405), and the determination flow is ended. When the host vehicle has made a lane change (YES in S407), lane change execution information is stored (S408), it is determined not to transmit the information (S405), and the determination flow is ended. When the vehicle has traveled a predetermined distance Y meters (m) after passing through the fork section (S406), information after the fork is stored (S409), the current state is set before traveling through the fork (S410), it is determined that the information is transmitted (S411), and the determination flow is ended.

FIG. 7*a* illustrates an example of information transmitted in the determination flow of FIG. 4. The information to be transmitted includes a road ID (pre-fork traveling road ID) of a traveling road on which a road on which the vehicle has been traveling before the fork can be identified, a road ID (post-fork traveling road ID) of a traveling road after the fork, and a flag (lane change flag) indicating a lane change state.

Figure 5:
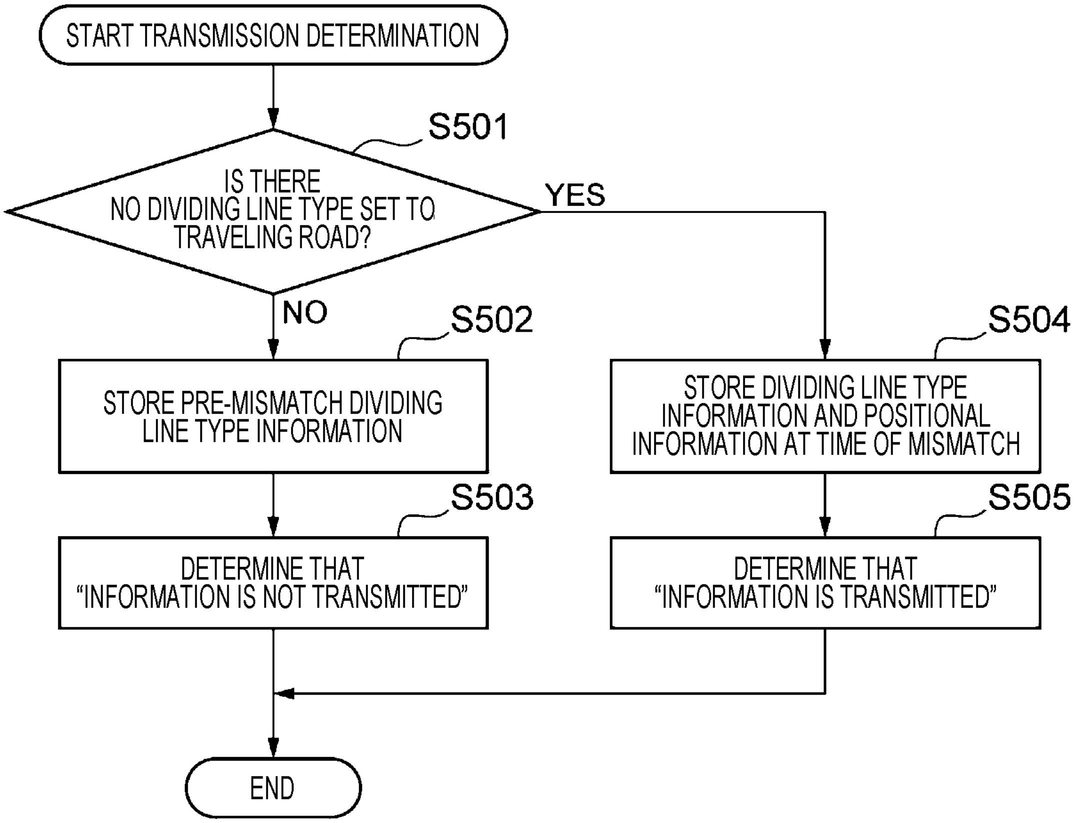
FIG. 5 is a flowchart of the difference determination unit.

FIG. 5 illustrates a flowchart related to generation and transmission of lane information mismatch information as an example of the logic of Transmission Determination 2 (S302). FIG. 7*b* illustrates an example of information transmitted in the determination flow of FIG. 5.

In Transmission Determination 2, it is determined whether road information of the road on which the vehicle is currently traveling includes a pattern of a type of lane-dividing line on the left and right of the vehicle which is currently recognized (S501). When there is a dividing line type at the traveling road, that is, when there is a matching pattern (NO in S501), the dividing line type information before mismatch is stored (S502), it is determined that the information is not transmitted (S503), and the determination flow is ended. Here, a process of overwriting to use the information acquired in the previous program cycle is performed. On the other hand, when there is no dividing line type at the traveling road, that is, when there is no matching pattern (YES in S501), the dividing line type information and the position information at the time of mismatch are stored (S504), it is determined that the information is transmitted (S505), and the determination flow is ended. Here, when it is found that the patterns are different, a process of rewriting the type and position information of the dividing line is performed.

Figure 6:
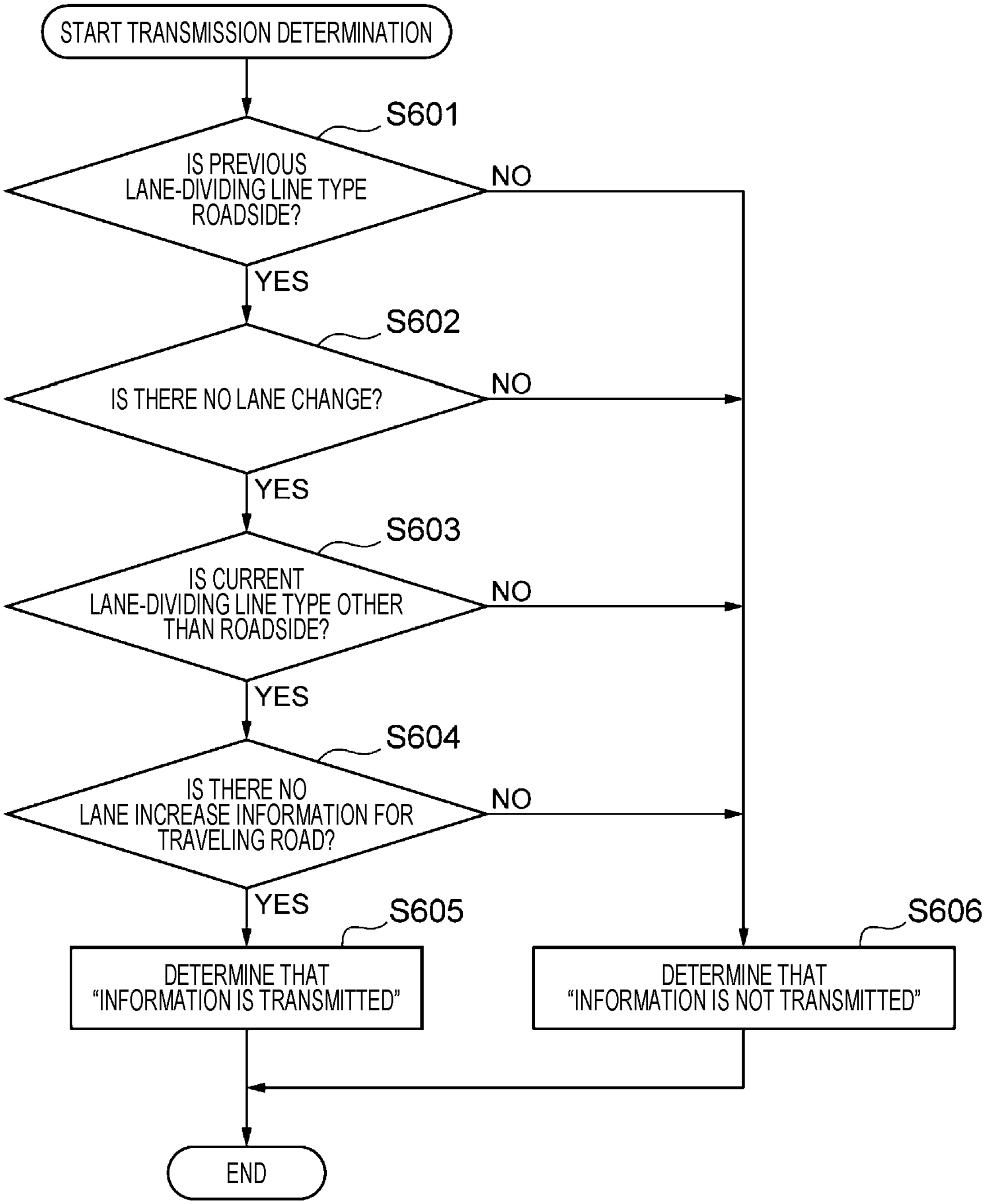
FIG. 6 is a flowchart of the difference determination unit.

FIG. 6 illustrates a flowchart related to generation and transmission of lane increase position determination information as an example of the logic of Transmission Determination 3 (S303).

In Transmission Determination 3, it is determined whether the previous information on a left and right lane-dividing line type is a roadside (S601). For example, in the example, when the information on the lane-dividing line type of the line on the left side of the traveling lane on which the host vehicle is traveling is a white solid line, it is determined that the left side is the roadside (YES in S601).

Thereafter, it is determined whether a lane change has not been made (S602). For example, when it is determined that the host vehicle crosses a dividing line based on an image captured by a camera, it is determined that a lane change has been made. Accordingly, it is determined whether or not current information of a lane-dividing line type is other than the roadside (S603). Then, based on the map information held in the map holding unit 102, it is determined whether there is no lane increase information in the map information of the road on which the vehicle is currently traveling (S604). When all the determinations in S601 to S604 are YES, it is determined that the information is transmitted (S605). When there is No in any of the determinations of S601 to S604, it is determined that the information is not transmitted (S606).

FIG. 7*c* illustrates an example of information to be transmitted in the flowchart of FIG. 6.

The information to be transmitted includes information before and after information of the left and right dividing line types changes. In addition, information of a road ID and latitude and longitude of which a change has been detected is also stored.

Figure 2:
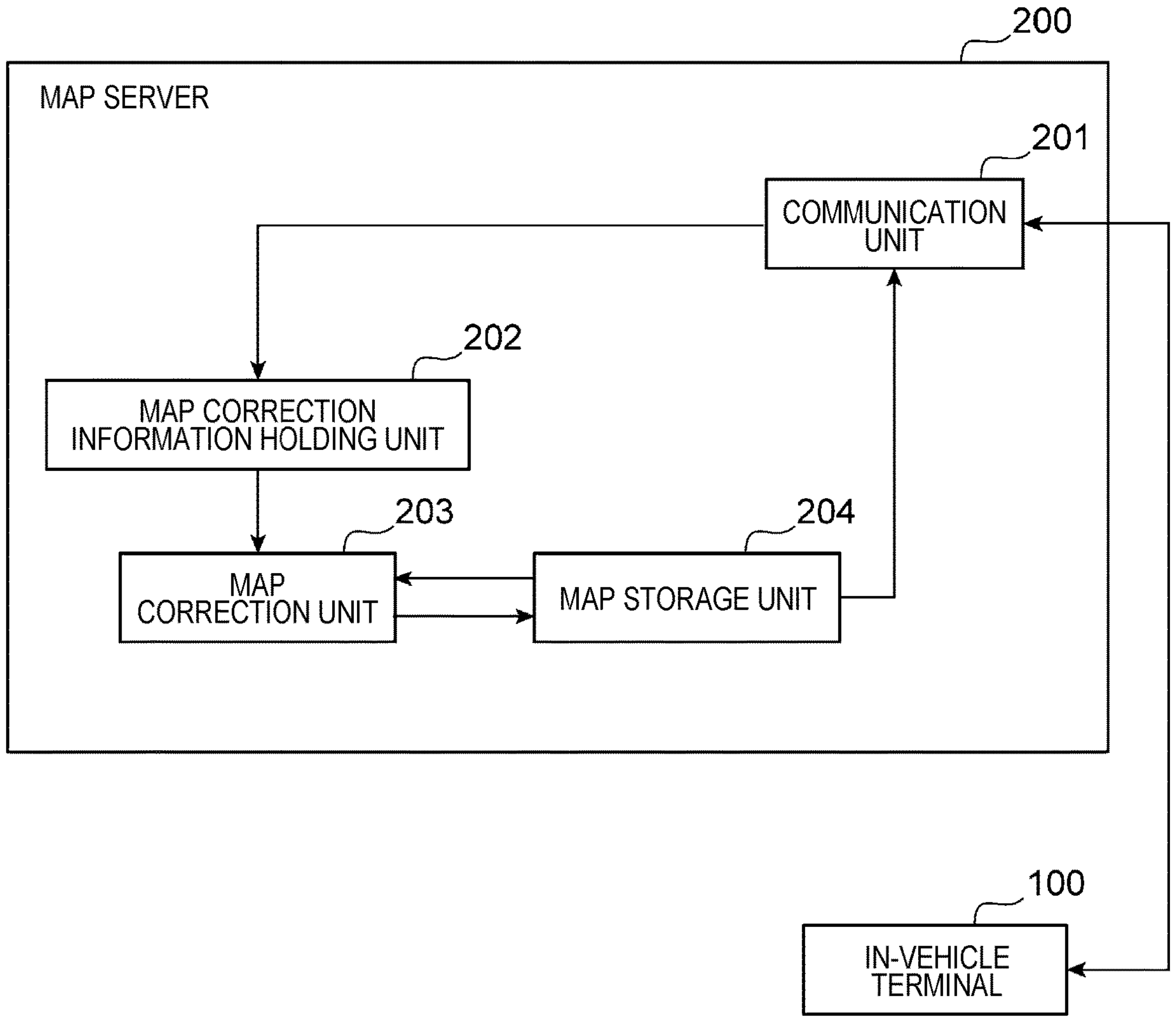
FIG. 2 is a diagram illustrating a configuration of a map server.

Next, FIG. 2 illustrates a configuration of the map server 200.

The map server 200 is configured of hardware and a software program and includes a communication unit 201, a map correction information holding unit 202, a map correction unit 203, and a map storage unit 204 as internal functions thereof. The communication unit 201 communicates with the plurality of in-vehicle terminals 100 via, for example, a wireless communication network and transmits map information of the map storage unit 204 to the in-vehicle terminal 100 and receives map correction information from the in-vehicle terminal 100. The communication unit 201 corresponds to a server-side reception unit and a server-side transmission unit in the claims of the present invention. The map correction information holding unit 202 holds map correction information transmitted from the in-vehicle terminal 100 and outputs the map correction information to the map correction unit 203. The map correction information holding unit 202 collects map correction information transmitted from each of the in-vehicle terminals 100 of the plurality of vehicles. The map correction unit 203 corrects map information from the correction information of the map correction information holding unit 202 and the map information of the map storage unit 204 and stores the corrected map information in the map storage unit 204. The map storage unit 204 stores the map information and transmits the map information to the in-vehicle terminal 100 via the map correction unit 203 and the communication unit 201.

Figure 9:
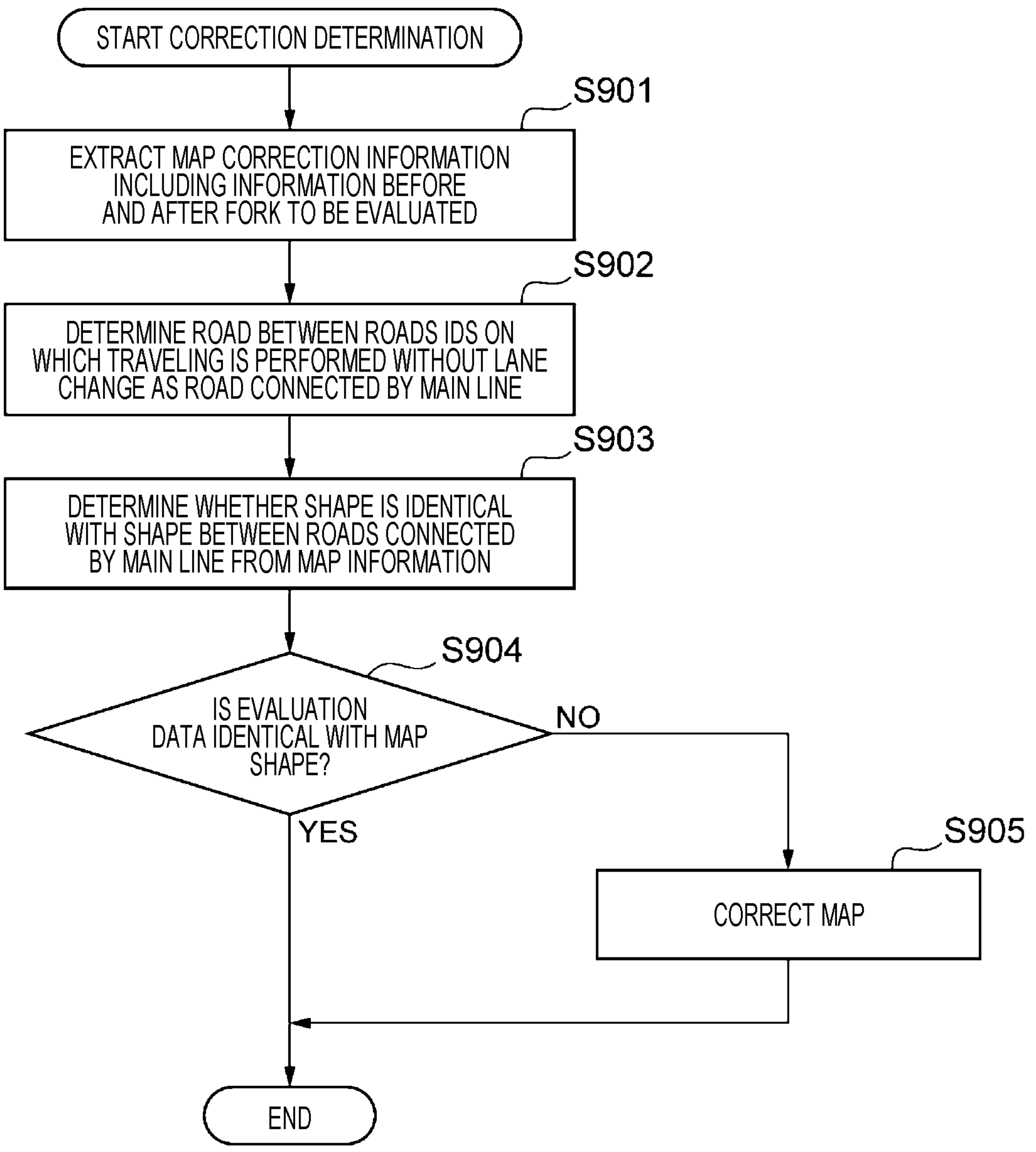
FIG. 9 is a flowchart of a map correction unit.
Figure 10:
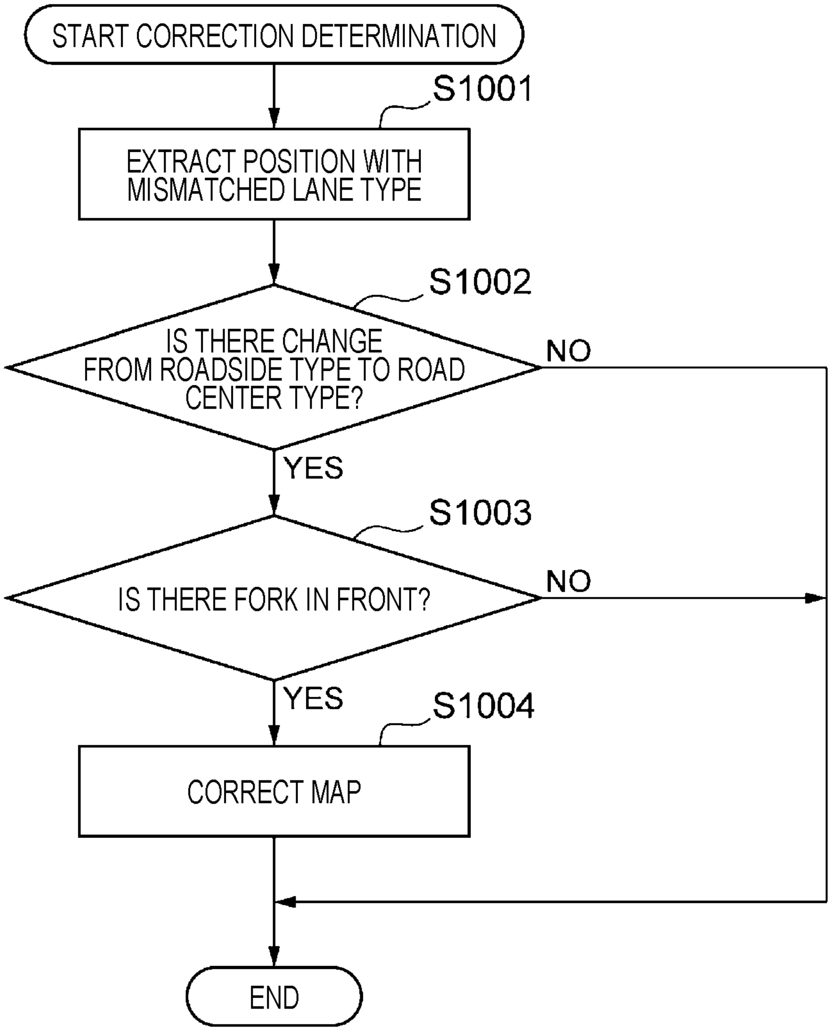
FIG. 10 is a flowchart of the map correction unit.
Figure 11:
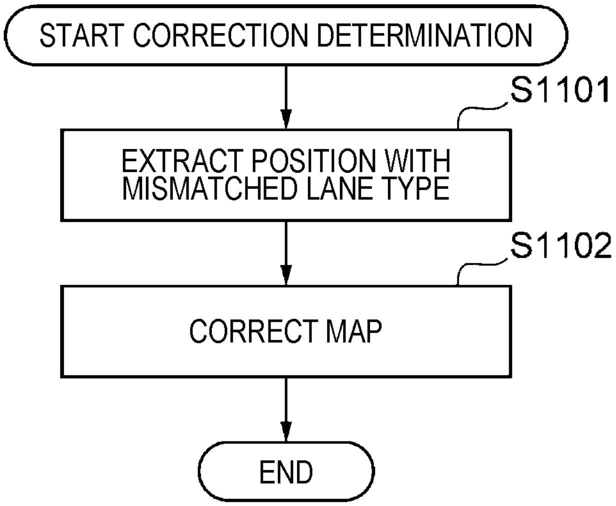
FIG. 11 is a flowchart of the map correction unit.

FIGS. 9, 10, and 11 are flowcharts of map correction operations of the map correction unit 203.

FIG. 9 illustrates determination of correction of a fork shape of a road.

In a road correction determination, as illustrated in FIG. 8*a*, map correction information including information before and after a fork to be evaluated is extracted (S901). Accordingly, a determination process (S902) of determining that a road between road IDs before and after the fork through which the vehicle is traveling without a lane change is a road connected by a main line is performed to determine whether the connection between the road IDs is a connection as a main line or a fork. Accordingly, it is determined from the map information whether a map shape matches a shape between the roads connected by the main line (S903). Thereafter, it is determined whether evaluation data and the map shape match each other (S904). When the evaluation data and the map shape match each other, the process is ended without correction. When the evaluation data and the map shape do not match each other, the map is corrected (S905).

Figure 12A:
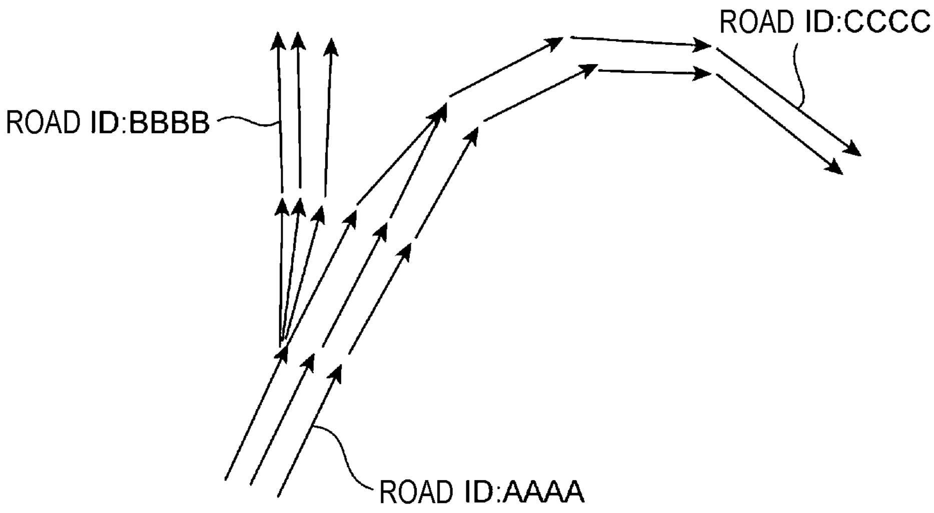
FIG. 12*a* is an example of map information to be corrected.
Figure 12B:
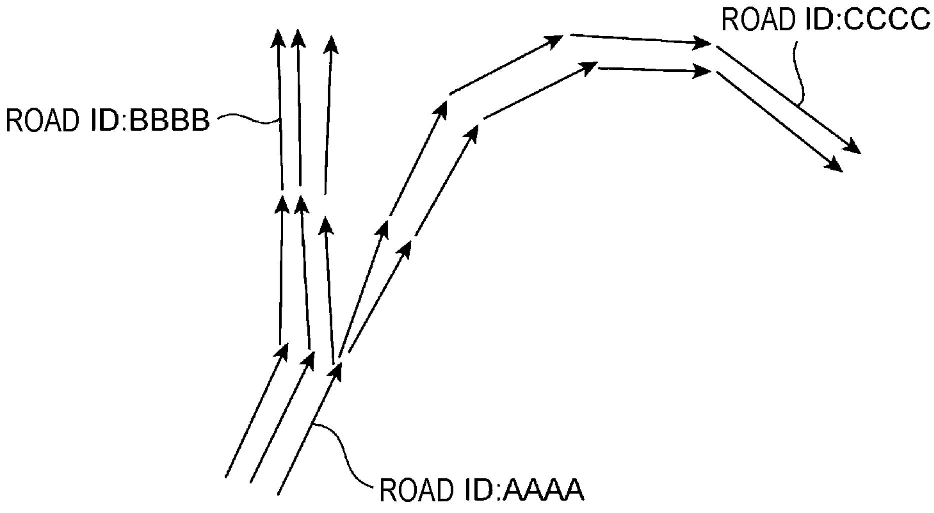
FIG. 12*b* is an example of map information to be corrected.

FIG. 8*a* illustrates acquired map correction information, FIG. 12*a* illustrates an image of a map before correction, and FIG. 12*b* illustrates an image of the map after correction. Information of Cases 1 to 3 illustrated in FIG. 8*a* is obtained by extracting information of the same point from the map correction information transmitted by the plurality of vehicles which is stored in the map correction information holding unit 202. According to the map correction information of FIG. 8*a*, in Case 1, since there is no lane change flag, it is determined that a road ID: AAAA and a road ID: BBBB are connected by a main line. Accordingly, in Case 2, since there is a lane change flag of right, it is determined that the road ID: AAAA and a road ID: CCCC are not connected on a main line. For example, when the map information stored in the map storage unit 204 at that time is information indicating that the road ID: BBBB is a branch lane from the road ID: AAAA as illustrated in FIG. 12*a*, the information is corrected to information indicating that the road ID: BBBB is a main line and is connected to the road ID: AAAA as illustrated in FIG. 12*b*.

FIG. 10 illustrates a correction determination of an occurrence position of a road branch lane.

First, a lane type mismatch position is extracted (S1001), and it is determined whether the extracted mismatch position has changed from a roadside type to a road center type (S1002). Here, for example, it is determined whether a type of dividing line is changed from a solid line representing the roadside to a broken line representing the dividing line on the road center side. Accordingly, the map information is read from the map storage unit 204, and it is determined whether there is a fork section in front of the host vehicle position (S1003). When both determinations in S1002 and S1003 are YES, the map information is corrected (S1004), and when at least one of the determinations is No, the map information is not corrected. By this process, for example, when the occurrence position of the road branch lane stored in the map storage unit 204 is actually a position on the further front side, the road shape can be corrected to a correct road shape.

Figure 13A:
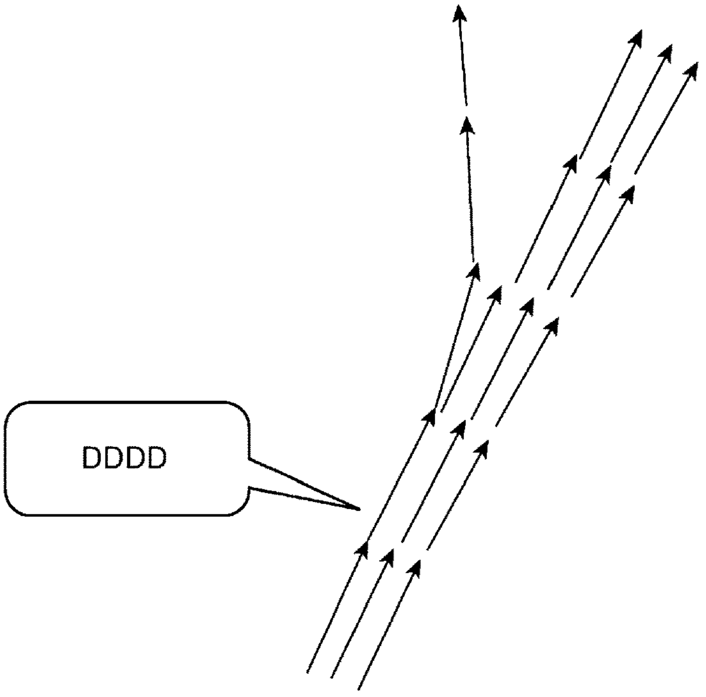
FIG. 13*a* is an example of map information to be corrected.
Figure 13B:
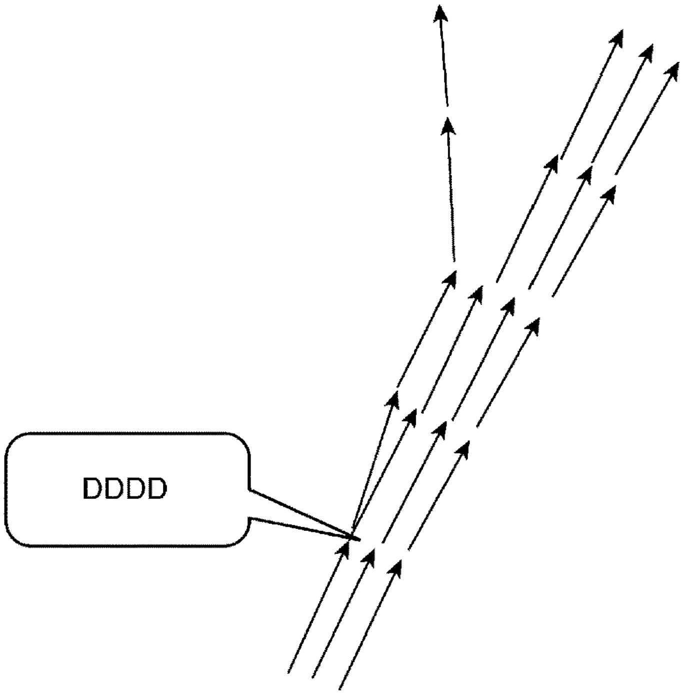
FIG. 13*b* is an example of map information to be corrected.

FIG. 8*b* illustrates acquired map correction information, FIG. 13*a* illustrates an image of a map before the occurrence position of the road branch lane is corrected, and FIG. 13*b* illustrates an image of the map after the occurrence position of the road branch lane is corrected. From the lane type information of FIG. 8*b* and the map information of FIG. 13*a*, it is determined that a lane increase for the fork starts from a position of a road ID: DDDD. Consequently, the occurrence position of the road branch lane is corrected from the position illustrated in FIG. 13*a* to the position of the road ID: DDDD illustrated in FIG. 13*b*.

FIG. 11 illustrates a determination of correction of the lane type information.

When the determination is started, a lane type mismatch position is extracted (S1101). Thereafter, the map information is corrected (S1102). Consequently, the road shape information can be corrected to correct road shape information.

Figure 14A:
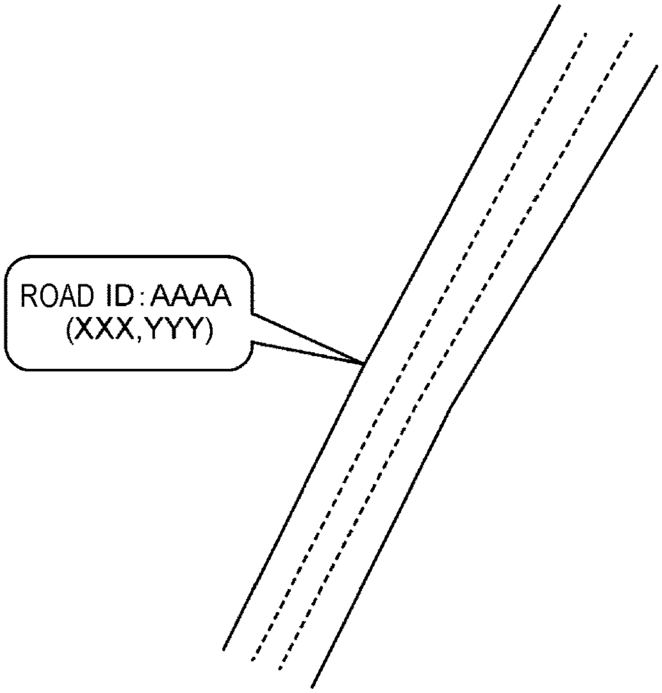
FIG. 14*a* is an example of map information to be corrected.
Figure 14B:
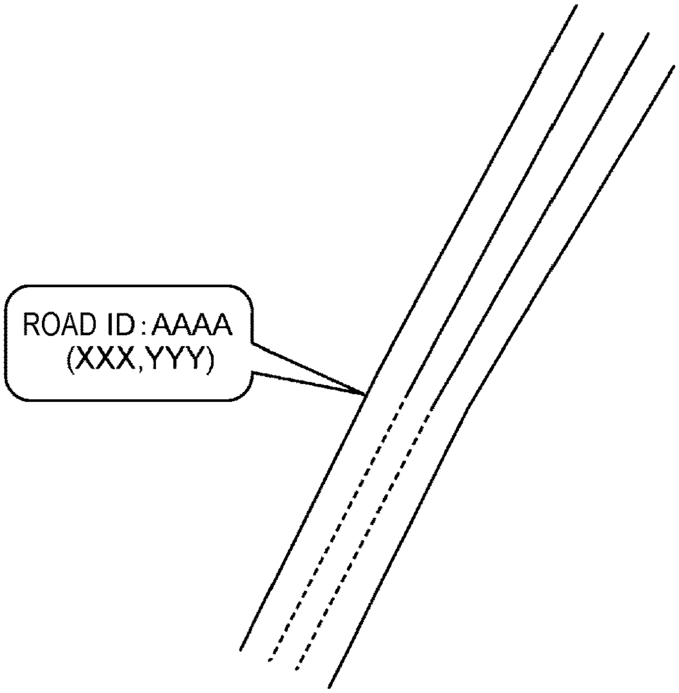
FIG. 14*b* is an example of map information to be corrected.

FIG. 8*c* illustrates the acquired map correction information, FIG. 14*a* illustrates an image of the map before correction, and FIG. 14*b* illustrates an image of the map after correction. It is determined that the type information of the lane-dividing line is changed from the position of the road ID: AAAA to a solid line by a change point of the lane type information in FIG. 8*c* and the map information in FIG. 14*a*, and the map information is corrected as illustrated in FIG. 14*b*.

According to the present invention, it is possible to improve the accuracy of a map with simple information such as vehicle position information and lane change information or information on a dividing line type. In addition, even in a case where construction is performed in which a connection form of a road and a lane-dividing line type change without changing a connection relationship of the road, it is possible to provide highly reliable map information by acquiring a difference between the real world and the map information and performing correction by the above method. In addition, even when there is an error in created map information itself, correction can be performed.

In the example, a case where the difference determination unit 103 determines the difference from the map information using the items of information respectively acquired by the dividing line information acquisition unit 105 and the lane change information acquisition unit 106 in the in-vehicle terminal 100 has been described as an example. However, the difference may be determined using only one of the items of information. In addition, in the example, the correction is performed when there is at least one item of difference information; however, in consideration of a possibility of abnormality or the like of an exterior environment sensor, a threshold value for performing the correction may be changed such that the correction is performed when a determination result of the difference is equal to or more than a certain amount.

Although the embodiments of the present invention have been described in detail above, the present invention is not limited to the above embodiments, and various design changes can be made without departing from the spirit of the present invention described in the claims. For example, the above-described embodiments have been described in detail in order to describe the present invention in an easy-to-understand manner and are not necessarily limited to those having all the described configurations. In addition, a part of a configuration of a certain embodiment may be replaced with a configuration of another embodiment, or the configuration of the other embodiment may be added to the configuration of the certain embodiment. Further, it is possible to add, remove, and replace other configurations for a part of the configuration of each embodiment.

REFERENCE SIGNS LIST

100 in-vehicle terminal
102 map holding unit
103 difference determination unit (generation unit)
104 position estimation unit
105 dividing line information acquisition unit
106 lane change information acquisition unit
107 exterior environment recognition unit
200 map server
202 map correction information holding unit
203 map correction unit
204 map storage unit

The invention claimed is:

1. A map information correction device that is mounted in a vehicle and corrects map information, the map information correction device comprising:

a computer processing unit (CPU) configured to:
hold the map information;
estimate position information of the vehicle;

acquire lane change information indicating whether or not the vehicle has changed a lane;
acquire information of a dividing line type of a road and whether the road on which the vehicle is traveling is branched; and
generate correction information for correcting the map information based on the position information, the lane change information, and the information of the dividing line type,
wherein the map information correction device is one of a plurality of map correction devices mounted in a plurality of vehicles, and each of the one or more map information correction devices includes the CPU, the CPU being further configured to collect a plurality of items of the correction information transmitted from the respective map information correction devices of the plurality of vehicles, and correct the map information using correction information at a same point from the plurality of items of correction information.

2. The map information correction device according to claim 1, wherein the CPU is further configured to:
determine whether or not there is a difference in information between the lane change information or the information of the dividing line type and the map information, and
when there is a difference in the information, determine that there is an error in the map information and generate the correction information.

3. The map information correction device according to claim 1, wherein the correction information includes information indicating whether or not a lane change has been made during traveling at a fork section of the road, where the lane is branched at the fork section into a first branch lane and a second branch lane.

4. The map information correction device according to claim 1, wherein the CPU is further configured to:
generate the correction information when the dividing line type is different from a dividing line type of a road on which the vehicle is currently traveling, stored in the map information.

5. The map information correction device according to claim 1, wherein the CPU is further configured to:
generate the correction information when a lane change is not made while the vehicle is traveling and the dividing line type changes from a dividing line indicating a roadside to a dividing line indicating a road center.

6. The map information correction device according to claim 1, wherein the CPU is further configured to:
generate the correction information when a previously determined dividing line type of the road indicates a roadside, a lane change has not been made, a currently determined dividing line type of the road indicates a type other than a roadside, and there is no information on an increase in lane on the road.

7. A map information correction system comprising:
a map information correction device that is mounted in a vehicle and corrects map information; and
a map server that transmits and receives map information to and from the map information correction device,
wherein each map information correction device includes:
a first computer processing unit (CPU) configured to:
hold the map information;
estimate position information of the vehicle;
acquire lane change information indicating whether or not the vehicle has changed a lane;
acquire information on a dividing line type of a road and whether the road on which the vehicle is traveling is branched;
generate correction information for correcting the map information based on the position information, the lane change information, and the information on the dividing line type; and
transmit the correction information to the map server,
wherein one or more map information correction devices are mounted in a plurality of vehicles, respectively, each of the one or more map information correction devices including the first CPU, the first CPU being further configured to collect a plurality of items of the correction information transmitted from the respective map information correction devices of the plurality of vehicles, and correct the map information using correction information at a same point from the plurality of items of correction information; and
wherein the map server includes:
a second computer processing unit (CPU) configured to
store the map information;
receive the correction information from the map information correction device; and
correct the map information based on the correction information.

8. The map information correction system according to claim 7, wherein:
the second CPU is further configured to:
transmit corrected map information to the map information correction device, and
the first CPU of the map information correction device is further configured to:
receive the corrected map information from the map server and update the map information based on the corrected map information.

9. The map information correction system according to claim 7, wherein the second CPU is further configured to:
acquire, from the map information correction device, road information for identifying roads before and after a fork section of the road at which the road is branched and information on whether or not a lane change has been made in the fork section and holds both items of the information, and
determine that a road after passing through the fork section is a main line when the lane change has not been made when the vehicle passes through the fork section,
determine whether or not the road after passing through the fork section matches the map information, and
correct the map information when the road after passing through the fork section does not match the map information.

* * * * *